United States Patent

[11] 3,574,345

| [72] | Inventor | Ronald Eric Brociner<br>Cornwall, England |
|---|---|---|
| [21] | Appl. No. | 752,293 |
| [22] | Filed | Aug. 13, 1968 |
| [45] | Patented | Apr. 13, 1971 |
| [73] | Assignee | English Clays Lovering Pochin & Company Limited<br>St. Austell, Cornwall, England |
| [32] | Priority | Aug. 18, 1967 |
| [33] | | Great Britain |
| [31] | | 3827/67 |

[54] TREATMENT OF FINELY DIVIDED MATERIALS
7 Claims, 3 Drawing Figs.

| [52] | U.S. Cl. | 259/148 |
|---|---|---|
| [51] | Int. Cl. | B28c 7/04 |
| [50] | Field of Search | 259/161, 9, 10, 178, 154, 148 |

[56] References Cited
UNITED STATES PATENTS

| 3,259,374 | 7/1966 | Doebl | 259/10 |
|---|---|---|---|
| 3,323,570 | 6/1967 | Tullock | 259/9X |
| 3,347,528 | 10/1967 | List | 259/10X |
| 3,392,962 | 7/1968 | Fritsch | 259/9 |

*Primary Examiner*—Robert W. Jenkins
*Attorney*—Stevens, Davis, Miller & Mosher

ABSTRACT: A process for treating particulate materials, such as clays and chalks, predominantly comprising particles smaller than 75 microns equivalent spherical diameter wherein a filter cake of the material is passed through a pugmill having an $L/D$ ratio in the range of from 4:1 to 10:1 under conditions such that the energy absorbed by the material is greater than 40 horsepower hours/ton of the material.

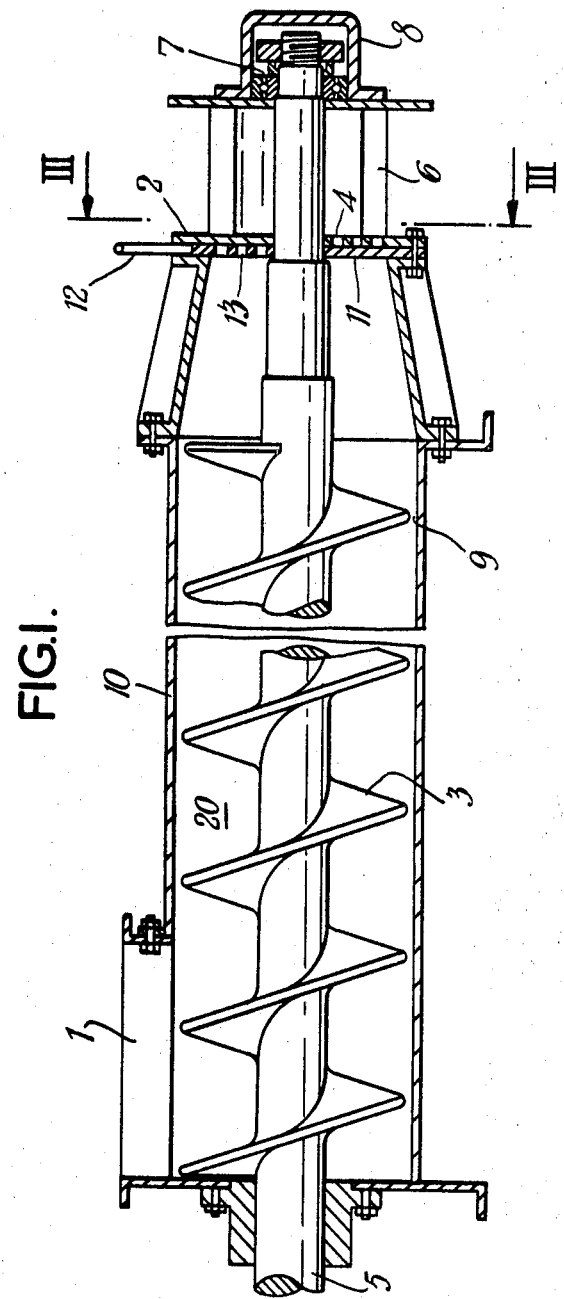

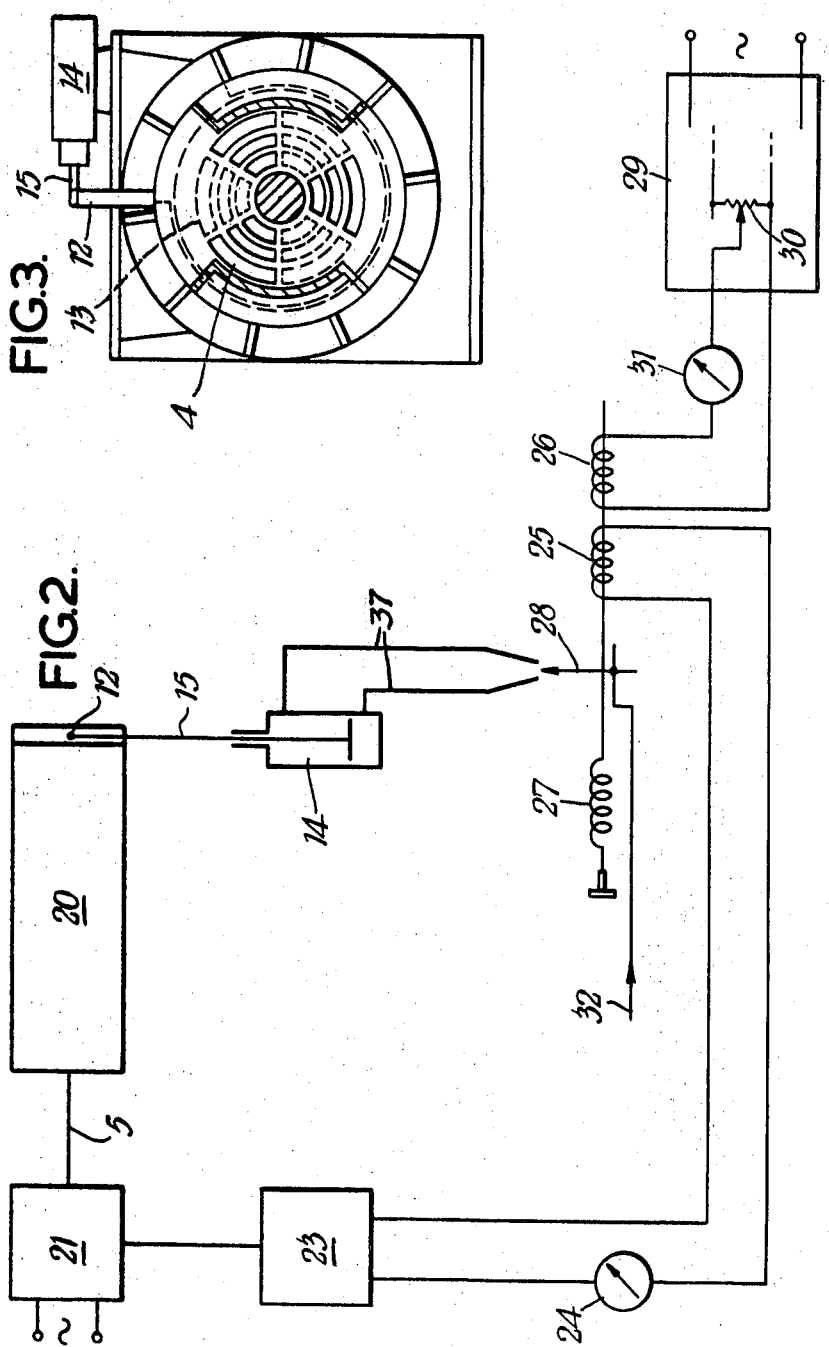

TREATMENT OF FINELY DIVIDED MATERIALS

BACKGROUND OF THE INVENTION

This invention relates to a process for the treatment of particulate materials, such as clays and chalks.

It is known, see for example British Pat. specification No. 706,429, to treat a plastic mass of a particulate material, such as a chalk or clay, predominantly comprising particles smaller than 75-microns equivalent spherical diameter by passing a moist filter cake of the material through a pugmill under conditions such that the material absorbs a quantity of energy ranging from about 8 to about 30 horsepower hours/ton of material, whereby the quantity of smaller particles in the material is increased.

We have found that greater beneficial changes in the properties of clays, for example, can be obtained if the process is carried out in a manner such that the energy dissipated in the clay, or other material being treated, is increased substantially as compared with the energy dissipated in the clay, or other material, when treated by the known process described above. British Pat. specification No. 706,429 discloses that in the case of clay, for example, the energy absorbed by the clay can be controlled by controlling the moisture content of the clay so that the amount of energy absorbed by the clay can be increased by reducing the moisture content of the clay. However, when the moisture content of a clay falls below 20 percent by weight the clay ceases to be plastic and, in practice, cannot be satisfactorily kneaded in the pugmill so that it is not possible, in this way, to increase the energy absorbed by the clay above about 30 horsepower hours/ton using a known pugmill as described in British Pat. specification No. 706,429. It is also possible to increase the energy absorbed by, for example, a clay by decreasing the size of the extrusion orifices at the outlet end of the barrel of the pugmill. However, it is found that when using a known pugmill of the type used heretofore, such as that described in specification No. 706,429, which has an $L/D$ ratio, i.e., the ratio of the effective length of the screw, or auger, in the barrel of the pugmill to the internal diameter of the portion of the barrel containing the screw, not exceeding 3.0:1, the energy input cannot be increased in this way beyond 50 horsepower hours/ton, when operating at the normal production rate of about 5 tons/hour, without the pugmill choking.

SUMMARY OF THE INVENTION

We have now found surprisingly and in accordance with the present invention that the greater beneficial changes, which can be produced in, for example, clays by increasing the energy consumed per ton of material being treated to a figure greater than 40 horsepower hours/ton, can be obtained by employing a pugmill having an $L/D$ ratio in the range of from 4:1 to 10:1.

More particularly, in accordance with the present invention there is provided a process for treating particulate materials, such as clays and chalks, predominantly comprising particles smaller than 75 microns equivalent spherical diameter wherein a filter cake of the material is passed through a pugmill having an $L/D$ ratio, as hereinbefore defined, in the range of from 4:1 to 10:1 under conditions such that the energy absorbed by the material is greater than 40 horsepower hours/ton of material and preferably is in the range of from 50 to 150 horsepower hours/ton of material.

DESCRIPTION OF THE PREFERRED EMBODIMENTS

Preferably, the $L/D$ ratio of the pugmill is in the region of 7.5:1.

The process of the present invention is of particular value for treating clays, for use in paper coating, which predominantly comprise particles smaller than 10 microns equivalent spherical diameter. The process of the invention is also useful for increasing the strength of clays for use in the manufacture of ceramics.

We have found that when using a pugmill having an $L/D$ ratio greater than 4:1 it is possible, without choking the pugmill, to increase the energy input to the desired level. Thus, when operating on clay or chalk and assuming a constant moisture content in the range of from 20 percent to 28 percent by weight, it is possible, by reducing the open area of the extrusion orifice(s), to increase the energy absorbed by the clay or chalk to the desired level.

Preferably, means are provided for adjusting the open area of the extrusion orifice(s) automatically according to the load on the motor driving the pugmill. The pugmill can thus be set to operate at any required power consumption; for a mixed throughput rate this means that the energy input into the clay can be controlled.

For a better understanding of the invention, and to show how the same may be carried into effect, reference will now be made, by way of example, to the accompanying drawing in which:

FIG. 1 is a longitudinal section through a pugmill suitable for use in the process of the present invention;

FIG. 2 is a schematic diagram showing the control system for the pugmill; and

FIG. 3 is a view taken on the line III—III of FIG. 1.

Referring to the accompanying drawings, it will be seen that the pugmill, generally designated 20, comprises a barrel 10 which has an opening 1, near one end, through which the untreated material is fed. An outlet 6 is provided at the other end of the barrel. A screw, or auger, 3 extends longitudinally of the barrel 10 and is driven by a motor 21, through a coupling located on an extension 5 of the shaft of the screw 3. A plate 2 extends across the barrel 10 near to the end of the barrel adjacent outlet 6 for the treated material, the plate 2 having apertures 4 through which the treated material escapes. On the side of the plate 2 remote from outlet 6 there is a second plate 11. The plate 11 can be moved angularly by means of a lever 12 which is operated by a piston rod 15 of a hydraulic cylinder 14, the movement of which is controlled by a signal from the load taken by the motor driving the screw 3. The plate 11 also has apertures 13 which are disposed so that they can register with the apertures 4. The apertures 4 are formed as three rings of sector orifices, the effective size of the apertures being varied by movement of the plate 11. At the outlet end of the pugmill 20, the shaft of the screw 3 is carried in a bearing 7 supported in an extension 8 of the pugmill barrel 10. The bearing 7 is designed to take a thrust load. The shaft of the screw 3 is of a heavy construction and carries a heavy screw and propelling blade. Between the periphery of the screw 3 and the barrel 10 of the pugmill is a gap 9 which is comparatively wide, being approximately half an inch when the screw is 2 feet in diameter. The $L/D$ ratio of the pugmill is much greater than that found in known pugmills of this type, being 7.5:1.

The control system for the pugmill is shown in FIG. 2. The primary winding of a first transformer of a current transformer rectifier unit 23 is included in the pugmill motor circuit so that a current in the range 0—5A., which is proportional to the current taken by the motor, is induced in the secondary winding; the primary current is in the range 0—500A. The secondary current is then further reduced by a second transformer of the current transformer rectifier unit 23 and rectified to give a DC signal in the range 0—15 ma. A DC milliammeter 24 is provided to give a direct indication of this current, which is also fed to one of a pair of electromagnetic coils 25 and 26, which, together with a spiral spring 27, determine the position of a pivoted oil-jet tube 28. The second electromagnetic coil is fed with a reference direct current supplied by a power pack 29 and variable within a range 0—15ma. by means of a potentiometer 30. A milliammeter 31 is provided to indicate the reference current. The electromagnetic coils 25, 26 are wound in opposite directions so that when equal currents are flowing in the two coils, the electromagnetic effects are equal and opposite and the pivoted oil-jet tube 28 is in an equilibrium position determined by the spring along. The oil-jet tube 28 is supplied with oil under high pressure through a conduit 32.

The oil jet from the tube 28 is directed into a port having two exit pipes 37 arranged so that the pressure in each of the exit pipes 37 depends on the position of the oil-jet tube 28. With the oil-jet tube 28 in its equilibrium position the pressure in the two exit pipes 37 is the same, and the piston in the hydraulic cylinder 14 does not move. However, if the position of the oil-jet tube 28 is changed from the equilibrium position, the pressures in the two exit pipes 37 are no longer equal and the piston moves up or down, thus opening or closing the pugmill orifice, and hence changing the pugmill motor load until the measured current again equals the reference current.

The energy put into the clay can be controlled by setting the control system to give the required power consumption for the throughput of the pugmill. If, due to minor moisture fluctuations in the feed to the pugmill, the motor load drops, the control system automatically closes the apertures 4, by moving the plate 11 angularly, until the required power consumption is restored. If the power consumption rises, the apertures 4 are opened.

The improvement in the properties of a clay and also of a precipitated chalk when treated by the process of the present invention can be seen from the following Tables:

TABLE 1

[Material: English China clay (for paper coating)]

| Energy absorbed in horsepower hours per ton of clay (HP-hr./ton) | Concentration[1] for 5 poise viscosity in the fully deflocculated state, w./w. | Percent of particles smaller than 2 microns equivalent spherical diameter |
| --- | --- | --- |
| 0 | 69.8 | 75 |
| 20 | 71.5 | 77 |
| 40 | 72.3 | 79 |
| 60 | 72.8 | 80 |
| 100 | 73.3 | 82 |
| 160 | 73.7 | 85 |

[1] The figures given are the solids concentrations in gm. of dry solids per 100 gm. of a fully deflocculated slip of the material having a viscosity of 5 poise.

TABLE 2

[Material: English China clay (for use in ceramics)]

| | Before treatment | 30 HP-hr./ton | 150 HP-hr./ton |
| --- | --- | --- | --- |
| Percent of particles smaller than 2 microns equivalent spherical diameter | 75 | 78 | 84 |
| Concentration for 5 poise viscosity in the fully deflocculated state, w./w., percent | 69.8 | 72.0 | 73.5 |
| Modulus of rupture at 80% RH (lbs./sq. in.) | 47 | 73 | 85 |

TABLE 3

[Material: Precipitated chalk]

| | Before treatment | 30 HP-hr./ton | 150 HP-hr./ton |
| --- | --- | --- | --- |
| Concentration for 5 poise viscosity in the fully deflocculated state, w./w., percent | 51 | 65 | 69 |

I claim:
1. A process for treating particulate materials, such as clays and chalks, containing particles smaller than 10 microns equivalent spherical diameter, comprising passing a filter cake of said materials through a pugmill having an $L/D$ ratio in the range of from 4:1 to 10:1 and imparting to said material energy in the range of from 50 to 150 horsepower hours/ton of material.

2. A process according to claim 1, further comprising passing said material through a plurality of orifices in said pugmill and varying the size of said orifices as a function of the energy imparted to said material.

3. A process according to claim 2, further comprising controlling the size of said orifices as a function of the load on a motor driving an auger of said pugmill.

4. A process for treating particulate materials containing particles smaller than 10 microns equivalent spherical diameter, comprising passing a filter cake of said material into a barrel, moving said material generally axially through said barrel by means of a motor driven screw mounted within said barrel, wherein the effective length of said screw relative to the internal diameter of the portion of said barrel containing said screw is a ratio in the range of from 4:1 to 10:1; forcing said material through a first set of apertures formed in a first plate disposed in the path of said material and further forcing said material through a second set of apertures formed in a second plate disposed in the path of said material adjacent to said first plate.

5. A process according to claim 4, further comprising controlling the size of orifices formed by the registry of said first and second sets of apertures by moving said first plate relative to said second plate.

6. A process according to claim 5, further comprising controlling the movement of said first plate relative to said second plate as a function of the electrical current load on said motor-driven screw.

7. A process for treating particulate materials, such as clays and chalks, containing particles smaller than 75 microns equivalent spherical diameter, comprising passing a filter cake of said materials having a moisture content in the range of from 20—28 percent by weight through a pugmill having an $L/D$ ratio in the range of from 4:1 to 10:1 and imparting to said material energy in the range of from 50 to 150 horsepower hours/ton of material.